(12) United States Patent
Arico (10) Patent No.: US 11,243,555 B2
(45) Date of Patent: Feb. 8, 2022

(54) VEHICLE SEAT HANDLE ASSEMBLY FOR MANUALLY RECLINING A SEAT BACK AND ADJUSTING A VERTICAL POSITION OF A SEAT BOTTOM

(71) Applicant: GM GLOBAL TECHNOLOGY OPERATIONS LLC, Detroit, MI (US)

(72) Inventor: Daniel Arico, New Baltimore, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 148 days.

(21) Appl. No.: 16/824,955

(22) Filed: Mar. 20, 2020

(65) Prior Publication Data

US 2021/0294370 A1 Sep. 23, 2021

(51) Int. Cl.
| | |
|---|---|
| *G05G 1/01* | (2008.04) |
| *B60N 2/16* | (2006.01) |
| *B60N 2/10* | (2006.01) |
| *G05G 25/00* | (2006.01) |
| *G05G 13/00* | (2006.01) |
| *G05G 1/04* | (2006.01) |
| *B60N 2/64* | (2006.01) |

(52) U.S. Cl.
CPC .............. *G05G 1/01* (2013.01); *B60N 2/10* (2013.01); *B60N 2/16* (2013.01); *B60N 2/64* (2013.01); *G05G 1/04* (2013.01); *G05G 13/00* (2013.01); *G05G 25/00* (2013.01)

(58) Field of Classification Search
CPC ............ G05G 1/01; G05G 1/04; G05G 13/00; G05G 25/00; B60N 2/10; B60N 2/16; B60N 2/64; B60N 2/22
See application file for complete search history.

(56) References Cited

U.S. PATENT DOCUMENTS

| | | | | |
|---|---|---|---|---|
| 7,472,963 | B2 * | 1/2009 | Jeong ................... | B60N 2/0296 297/463.1 |
| 7,938,490 | B2 * | 5/2011 | Ishijima ................. | B60N 2/165 297/358 |
| 7,959,229 | B2 * | 6/2011 | Ishijima ............... | B60N 2/0296 297/358 |
| 8,353,561 | B2 * | 1/2013 | Yamazaki ................ | B60N 2/90 297/452.38 |

(Continued)

OTHER PUBLICATIONS

U.S. Appl. No. 16/589,608, filed Oct. 1, 2019, Arico et al.

*Primary Examiner* — Daniel D Yabut
(74) *Attorney, Agent, or Firm* — Harness, Dickey & Pierce, P.L.C.

(57) ABSTRACT

A handle assembly for a seat of a vehicle includes an up/down handle, a recline handle, and a finger guard. The up/down handle is configured to adjust a vertical position of a seat bottom when the up/down handle is rotated relative to the seat about a first pivot axis. The recline handle is configured to allow an angle of a seat back to be adjusted when the recline handle is rotated relative to the seat about a second pivot axis. The finger guard is configured to cover a gap between the up/down handle and the recline handle to prevent an occupant in the seat from inserting a finger into the gap. The finger guard is separate from and attached to the recline handle and is configured to rotate about a third pivot axis relative to the recline handle independent of rotation of the recline handle about the second pivot.

20 Claims, 6 Drawing Sheets

(56) References Cited

U.S. PATENT DOCUMENTS

| | | | |
|---|---|---|---|
| 9,022,477 B2* | 5/2015 | Pleskot | B60N 2/06 |
| | | | 297/361.1 |
| 10,059,240 B2* | 8/2018 | Mitsumoto | B60N 2/16 |
| 2012/0313408 A1* | 12/2012 | Nagata | B60N 2/42709 |
| | | | 297/216.1 |
| 2015/0336490 A1* | 11/2015 | Nie | B60N 2/986 |
| | | | 297/452.18 |
| 2017/0210252 A1* | 7/2017 | Izawa | B60N 2/165 |
| 2018/0029512 A1* | 2/2018 | Minegishi | B60N 2/58 |
| 2018/0056828 A1* | 3/2018 | Mitsumoto | B60N 2/16 |
| 2019/0092200 A1* | 3/2019 | Minegishi | B60N 2/165 |

* cited by examiner

VEHICLE SEAT HANDLE ASSEMBLY FOR MANUALLY RECLINING A SEAT BACK AND ADJUSTING A VERTICAL POSITION OF A SEAT BOTTOM

CROSS-REFERENCE TO RELATED APPLICATIONS

The present disclosure is related by subject matter to U.S. patent application Ser. No. 16/589,608, filed on Oct. 1, 2019. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle seat handle assemblies for manually reclining a seat back and adjusting a vertical position of a seat bottom.

Vehicle seats typically include knobs, levers, or handles for adjusting the angle of a seat back relative to a seat bottom and for adjusting the vertical position or height of the seat bottom. Such seat adjustment mechanisms may be manual or automatic. Manual seat adjustment mechanisms rely on an occupant to provide the force required to move the seat back or the seat bottom to the position desired by the occupant. Automatic seat adjustment mechanisms typically include an electric motor that provides the force required to move the seat back or the seat bottom to the position desired by the occupant.

Manual seat adjustment mechanisms typically include an up/down handle and a recline handle. Rotating the up/down handle upward raises the seat bottom. Rotating the up/down handle downward lowers the seat bottom. Rotating the recline handle upward unlocks a recline adjustment mechanism, which enables the occupant to move the seat back to a desired angle by, for example, rotating his or her torso forward or backward while sitting in the seat.

SUMMARY

An example handle assembly for a seat of a vehicle is disclosed. The handle assembly includes an up/down handle, a recline handle, and a finger guard. The up/down handle is configured to adjust a vertical position of a seat bottom when the up/down handle is rotated relative to the seat about a first pivot axis. The recline handle is configured to allow an angle of a seat back to be adjusted when the recline handle is rotated relative to the seat about a second pivot axis. The finger guard is configured to cover a gap between the up/down handle and the recline handle to prevent an occupant in the seat from inserting a finger into the gap. The finger guard is separate from and attached to the recline handle and is configured to rotate about a third pivot axis relative to the recline handle independent of rotation of the recline handle about the second pivot.

In one example, rotating the up/down handle upward about the first pivot axis causes the up/down handle to contact the finger guard and thereby rotate the finger guard upward about the third pivot axis.

In one example, rotating the recline handle upward about the second pivot axis causes the recline handle to contact the finger guard and thereby rotate the finger guard upward about the third pivot axis.

In one example, the finger guard is pivotally mounted to the recline handle along the third pivot axis.

In one example, the recline handle defines a hole that extends through the recline handle in a lateral direction of the vehicle, and the finger guard includes a plurality of mounting tabs that extend through and engage the hole.

In one example, the handle assembly further includes a torsion spring that biases an underside surface of the finger guard toward a top surface of the recline handle. The recline handle defines a first stop for a first end of the torsion spring, and the finger guard defines a second stop for a second end of the torsion spring.

In one example, if the seat back rotates downward independent of actuation of the recline handle, the recline handle is configured to rotate downward with the seat back.

In one example, the finger guard is configured to rotate downward with the recline handle until the finger guard contacts the up/down handle, and the recline handle is configured to continue rotating downward with the seat back as the finger guard is at rest due to contact between the finger guard and the up/down handle.

In one example, the up/down handle defines a hole for receiving a fastener to pivotally mount the up/down handle to the seat bottom, and the handle assembly further includes a cap configured to snap onto the up/down handle and cover the hole.

In one example, the up/down handle defines a hole for receiving a fastener to pivotally mount the up/down handle to the seat bottom, and the finger guard covers the fastener when the up/down and recline handles are not actuated.

An example seat assembly for a vehicle is disclosed. The seat assembly includes a seat bottom, a seat back, an up/down handle, a recline handle, and a finger guard. The up/down handle is pivotally mounted to the seat bottom along a first pivot axis. Rotating the up/down handle relative to the seat bottom about the first pivot axis adjusts a vertical position of the seat bottom. The recline handle is pivotally mounted to the seat bottom along a second pivot axis. Rotating the recline handle relative to the seat bottom about the second pivot axis enables an angle of the seat back to be adjusted. The finger guard covers a gap between the up/down handle and the recline handle to prevent an occupant in the seat from inserting a finger into the gap. The finger guard is separate from the recline handle and is pivotally mounted to the recline handle along a third pivot axis to enable rotation of the finger guard relative to the recline handle about the third pivot axis independent of rotation of the recline handle about the second pivot axis.

In one example, rotating the up/down handle upward about the first pivot axis causes the up/down handle to contact the finger guard and thereby rotate the finger guard upward about the third pivot axis.

In one example, the seat assembly further includes a side shield that covers a side of the seat bottom, wherein the up/down and recline handles are disposed outboard of and adjacent to the side shield.

In one example, each of the up/down and recline handles includes a base, a lever arm, and a grip, and the base of the recline handle is disposed rearward of and higher than the base of the up/down handle.

In one example, the base of recline handle defines a socket configured to receive a boss projecting outboard from the side shield to pivotally mount the recline handle to the seat bottom.

In one example, the socket of recline handle defines splines configured to engage corresponding splines on a seat recline mechanism.

In one example, the finger guard includes a base, a lever arm, and a shroud, and the shroud of the finger guard is configured to cover an entire top surface of the grip of the recline handle.

In one example, the shroud of the finger guard is configured to rest on the top surface of the grip of the recline handle except when the up/down handle is rotated upward while the recline handle is not rotate upward.

In one example, the shroud of the finger guard is aligned with the grip of the up/down handle in a lateral direction of the vehicle.

In one example, the shroud of the finger guard includes a top wall configured to cover the entire top surface of the grip of the recline handle and a horizontal gap between the side shield and the recline handle, and a sidewall configured to cover a vertical gap that exits between the top wall of the finger guard and the recline handle when the up/down handle is rotated upward.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

As discussed above, a vehicle seat with a manual adjustment mechanism typically includes an up/down handle and a recline handle. The handles are pivotally attached to the side of the seat bottom and extend alongside the seat bottom within close proximity thereof and with each other. The handles are within close proximity of the side of the seat bottom to provide clearance between the handles and a vehicle sidewall disposed outboard of the handles so that an occupant may fit a hand between the handles and the sidewall to operate the handles.

Typically, the recline handle is mounted rearward of the up/down handle. Thus, the portion of the recline handle that is gripped by the occupant is disposed next to the lever arm and/or the pivot or base of the up/down handle, which presents a pinch risk. Therefore, some recline handles include a finger guard feature that covers gaps between the handles to prevent an occupant from inserting a finger between the handles. The finger guard feature is integrally formed with the remainder of the recline handle.

The finger guard feature increases the overall size of the recline handle, and therefore compromises are typically made when packaging and designing the handles. For example, the grip of the recline handle is typically disposed outboard of the up/down handle, which increases the amount by which the handles project from the side of the seat bottom compared to if the handles were aligned with one another in the side-to-side direction. In addition, the width of the grip on the recline handle is typically less than desired to provide sufficient clearance outboard of the handles.

To address these issues, a handle assembly according to the present disclosure includes a recline handle with a finger guard that is separate from the recline handle and pivotally attached thereto. This design enables the up/down and recline handles to be aligned with one another in the side-to-side direction, as contact between the up/down handle and the figure guard does not affect operation of the handles. Instead, the finger guard rotates away from the recline handle about the pivot attachment thereto when the up/down handle contacts the finger guard due to rotation of the up/down or recline handle. In addition, since more clearance is provided outboard of the handles, the grip on the recline handle has a desired width.

Referring now to FIGS. 1-4 a vehicle seat assembly 10 includes a seat bottom 12, a seat back 14, and a handle assembly 16. The seat bottom 12 includes a side shield 18 that covers one side of the seat bottom 12. For example, the side shield 18 may cover the outboard side of the seat bottom 12 (i.e., the side of the seat bottom 12 that is closest to a vehicle door). The side shield 18 may be formed (e.g., molded) from plastic.

The handle assembly 16 includes an up/down handle 20, a recline handle 22, and a finger guard 24. Each of the up/down and recline handles 20 and 22 are pivotally mounted to the seat bottom 12 and are disposed adjacent to the side shield 18. If the side shield 18 covers the outboard side of the seat bottom 12, the up/down and recline handles 20 and 22 are disposed outboard of the side shield 18. The finger guard 24 is pivotally mounted to the recline handle 22. The up/down handle 20, the recline handle 22, and the finger guard 24 may be formed (e.g., molded, casted, machined) from plastic and/or metal.

Figure 2:
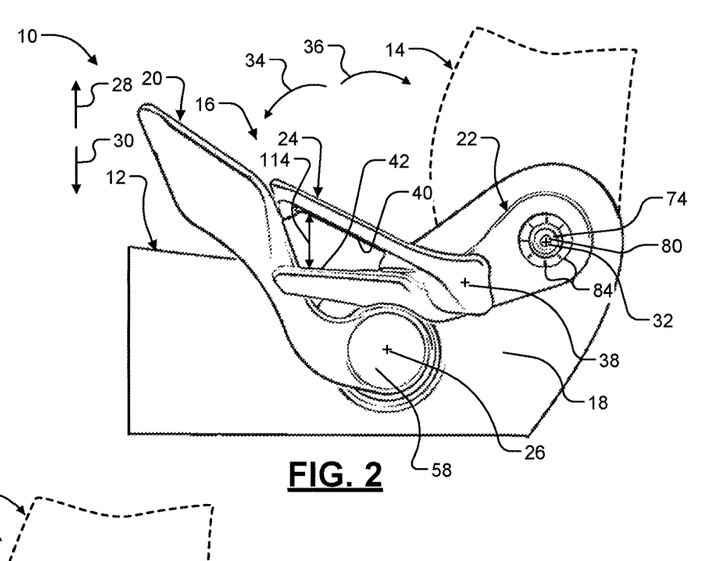
FIG. 2 is a side perspective view of the vehicle seat assembly of FIG. 1 showing the up/down handle and the finger guard rotated upward.
Figure 3:
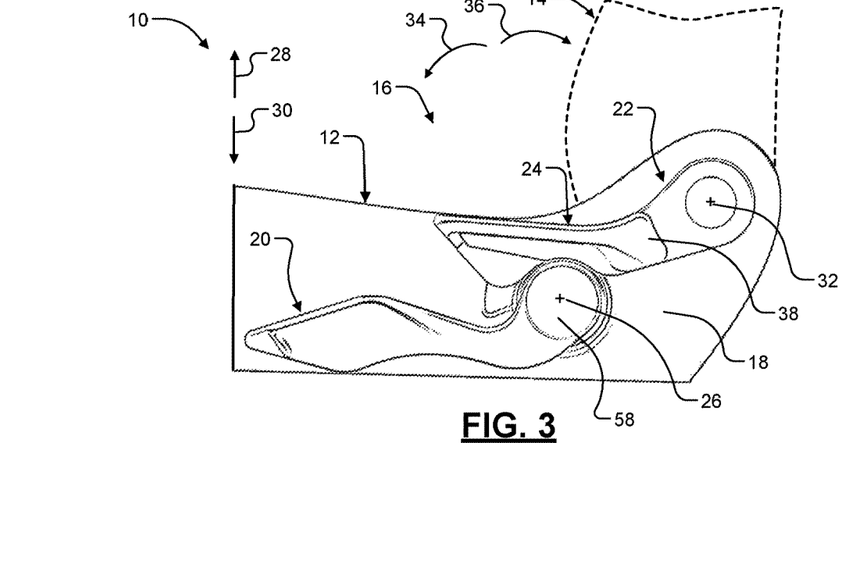
FIG. 3 is a side perspective view of the vehicle seat assembly of FIG. 1 showing the up/down handle rotated downward.

The up/down handle 20 is mounted to the seat bottom 12 in a manner that allows the up/down handle 20 to rotate relative to the seat bottom 12 about a first pivot axis 26. The first pivot axis 26 extends into and out of the page. Rotating the up/down handle 20 relative to the seat bottom 12 about the first pivot axis 26 adjusts the vertical position of the seat bottom 12. Rotating the up/down handle 20 upward about the first pivot axis 26 as shown in FIG. 2 raises the seat bottom 12 (i.e., moves the seat bottom 12 in an upward direction 28). Rotating the up/down handle 20 downward about the first pivot axis 26 as shown in FIG. 3 lowers the seat bottom 12 (i.e., moves the seat bottom 12 in a downward direction 30). The vehicle seat assembly 10 includes a height adjustment mechanism (not shown) that adjusts the height of the seat bottom 12 when the up/down handle 20 is rotated about the first pivot axis 26.

Figure 4:
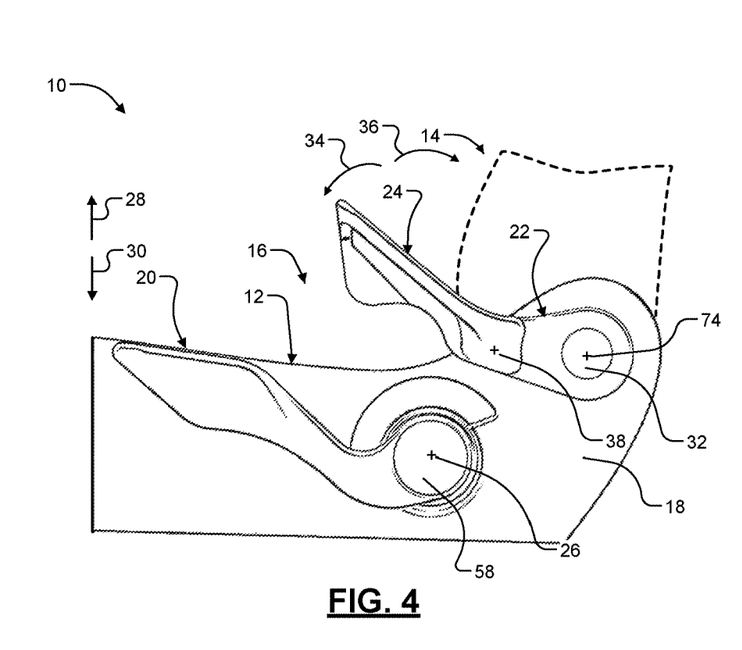
FIG. 4 is a side perspective view of the vehicle seat assembly of FIG. 1 showing the recline handle and the finger guard rotated upward.

The recline handle 22 is mounted to the seat bottom 12 in a manner that allows the recline handle 22 to rotate relative to the seat bottom 12 about a second pivot axis 32. The second pivot axis 32 extends into and out of the page. Rotating the recline handle 22 upward about the second pivot axis 32 enables adjustment of the angle of the seat back 14 relative to the seat bottom 12. For example, when the recline handle 22 is rotated upward about the second pivot axis 32 as shown in FIG. 4, the seat back 14 may be manually rotated (i.e., rotated by hand) relative to the seat bottom 12 in a forward direction 34 or a rearward direction 36.

The vehicle seat assembly 10 includes a recline adjustment mechanism (not shown). The recline adjustment mechanism prevents the seat back 14 from rotating relative to the seat bottom 12 when the recline adjustment mechanism is locked. The recline adjustment mechanism allows the seat back 14 to rotate relative to the seat bottom 12 when the recline adjustment mechanism is unlocked. Rotating the recline handle 22 upward relative to the seat bottom 12 unlocks the recline adjustment mechanism, and releasing the recline handle 22 locks the recline adjustment mechanism.

The finger guard 24 covers gaps between the up/down handle 20 and the recline handle 22, and between the side shield 18 and the recline handle 22, to prevent an occupant in the seat from inserting a finger into the gaps. The finger guard 24 is separate from the recline handle 22 and mounted to the recline handle 22 in a manner that allows the finger guard 24 to rotate relative to the recline handle 22 about a third pivot axis 38. The third pivot axis 38 extend into and out of the page. The finger guard 24 is rotatable relative to the recline handle 22 about the third pivot axis 38 independent of rotation of the recline handle 22 relative to the seat bottom 12 about the second pivot axis 32.

Figure 1:
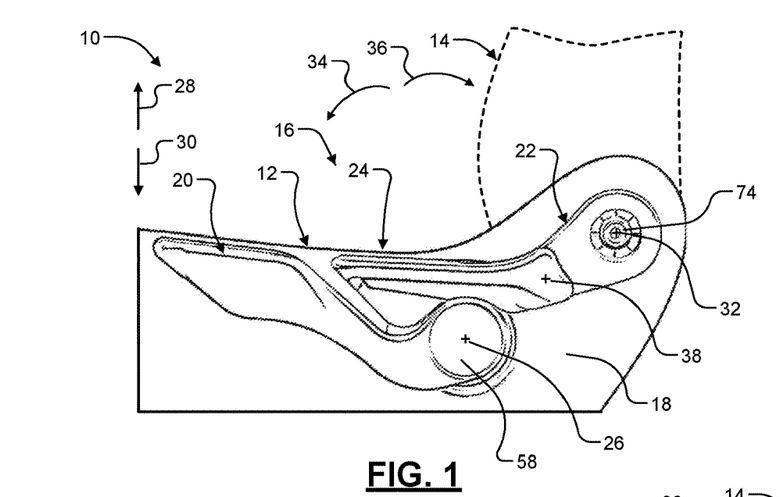
FIG. 1 is a side perspective view of a vehicle seat assembly including a side shield and an example handle assembly according to the present disclosure, the handle assembly including an up/down handle, a recline handle, and a finger guard.

When the up/down handle 20 and the recline handle 22 are not actuated as shown in FIG. 1, an underside surface 40 (FIG. 2) of the finger guard 24 rests on a top surface 42 (FIG. 2) of the recline handle 22. If the recline handle 22 is rotated upward about the second pivot axis 32 as shown in FIG. 4, or if the up/down handle 20 is rotated downward about the first pivot axis 26 as shown in FIG. 3, the finger guard 24 remains seated on the top surface 42 of the recline handle 22. If the up/down handle 20 is rotated upward about the first pivot axis 26 while the recline handle 22 is unactuated as shown in FIG. 2, the up/down handle 20 contacts the finger guard 24 and thereby causes the finger guard 24 to rotate upward. In turn, the finger guard 24 is no longer seated on the top surface 42 of the recline handle 22.

Since the finger guard 24 is separate from and pivotally mounted to the recline handle 22, the finger guard 24 can be rotated upward due to contact with the up/down handle 20 without causing the recline handle 22 to rotate upward. In turn, the recline handle 22 and the finger guard 24 may be moved further inboard (e.g., closer to the side shield 18). This provides a more compact design and thereby provides more clearance between the handle assembly 16 and vehicle components (e.g., body structure, door) disposed outboard of the handle assembly 16.

Figure 5:
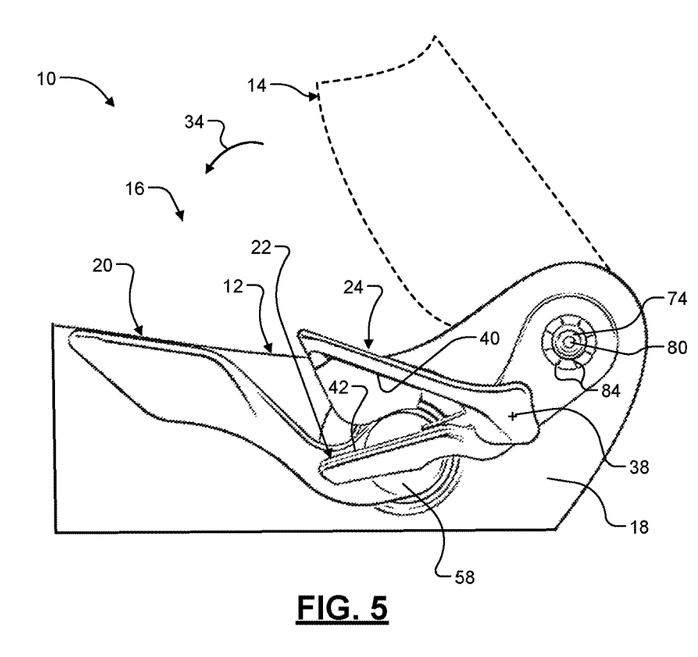
FIG. 5 is a side perspective view of the vehicle seat assembly of FIG. 1 showing the recline handle rotated downward and the finger guard rotated upward.

Referring now to FIG. 5, in certain situations, the seat back 14 may rotate in the forward direction 34 independent of actuation of the recline handle 22 (i.e., when the recline handle 22 is not actuated upward about the second pivot axis 32 to unlock the recline adjustment mechanism). In other words, the seat back 14 may rotate in the forward direction 34 when the recline adjustment mechanism is locked. For example, the seat back 14 may rotate in the forward direction 34 when the recline adjustment mechanism is locked if an object contacts a back surface 44 of the seat back 14 during a vehicle impact.

The recline handle 22 is configured to rotate downward about the second rotational axis 32 with the seat back 14 as the seat back 14 rotates in the forward direction 34 while the recline adjustment mechanism is locked. As the recline handle 22 rotates downward about the second rotational axis 32, the finger guard 24 contacts the up/down handle 20, which prevents the finger guard 24 from rotating downward with the recline handle 22. In turn, the finger guard 24 separates from the recline handle 22, and the underside surface 40 of the finger guard 24 no longer rests on the top surface 42 of the recline handle 22.

Since the finger guard 24 is separate from and pivotally mounted to the recline handle 22, the finger guard 24 can not rotate downward due to contact with the up/down handle 20 without interfering with the downward rotation of the recline handle 22. Thus, as discussed above, the recline handle 22 and the finger guard 24 may be moved further inboard to provide more clearance on the outboard side of the handle assembly 16.

Figure 6:
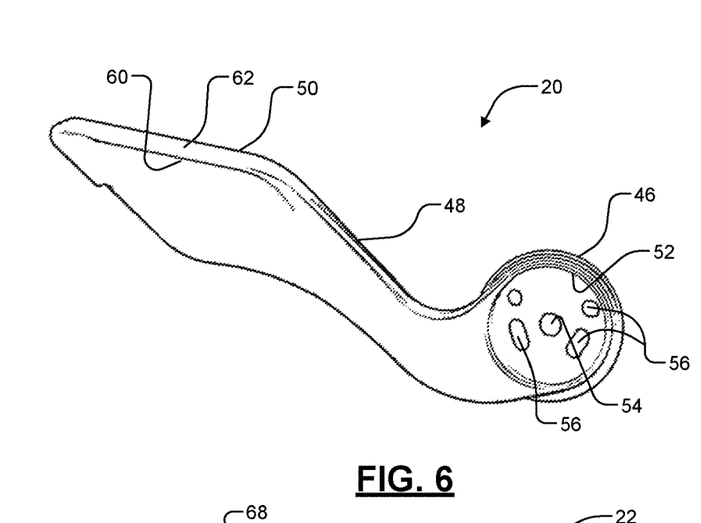
FIG. 6 is a perspective view of the backside of the up/down handle.

Referring now to FIG. 6, the up/down handle 20 includes a base 46, a lever arm 48, and a grip 50. The base 46 of the up/down handle 20 defines a circular pocket or recess 52, a center hole 54, and a plurality of offset holes 56. The center hole 54 and the offset holes 56 are disposed within the recess 52 and extend through the base 46 and a lateral (e.g., side-to-side) direction of the vehicle. The center hole 54 receives a fastener (not shown) that attaches the up/down handle 20 to the vertical adjustment mechanism. The recess 52 receives a disk-shaped cap 58 (FIGS. 1-5) that covers the fastener to hide the fastener from view of the occupant for aesthetic purposes. The cap 58 may include a plurality of mounting tabs that are inserted into the offset holes 56 as the cap 58 is placed into the recess 52, and the mounting tabs may engage the offset holes 56 via a snap fit to retain the cap 58 on the up/down handle 20.

The grip 50 of the up/down handle 20 defines a groove or depression 60 in which the occupant may place his or her fingers to rotate the up/down handle 20 upward. In addition, the occupant may push on a top surface 62 of the grip 50 to rotate the up/down handle 20 downward. The lever arm 48 of the up/down handle 20 extends between and connects the base 46 of the up/down handle 20 and the grip 50 of the up/down handle 20 to one another.

Figure 7:
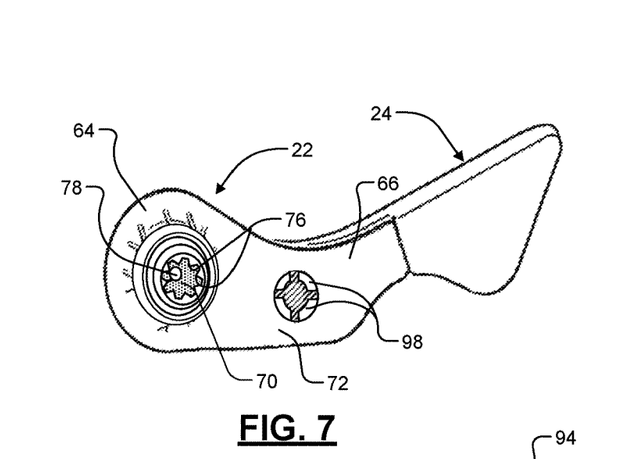
FIG. 7 is a perspective view of the backside of a subassembly that includes the recline handle and the finger guard.
Figure 8:
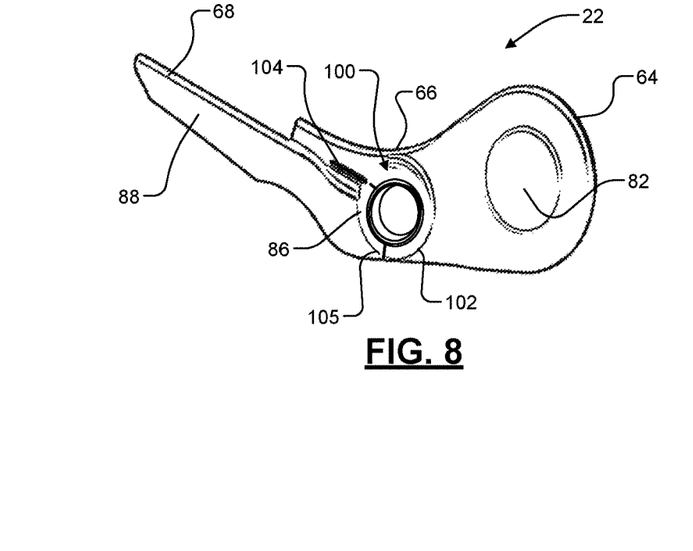
FIG. 8 is a side perspective view of the recline handle with the finger guard removed therefrom to illustrate a torsion spring captured between the recline handle and the finger guard.
Figure 9:
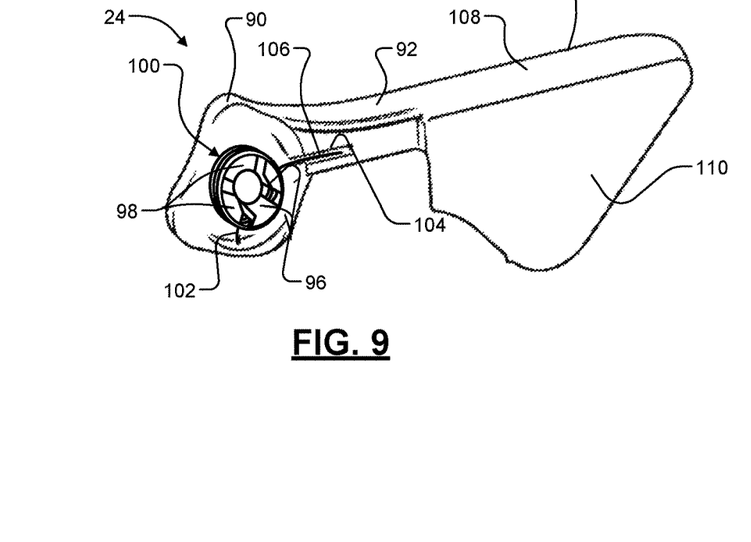
FIG. 9 is a perspective view of the backside of the finger guard showing the torsion spring assembled to the finger guard.

Referring now to FIGS. 7-9, the recline handle 22 includes a base 64, a lever arm 66, and a grip 68. The base 64 of the recline handle 22 defines a socket 70 disposed on a backside 72 of the recline handle 22 (e.g., the side of the recline handle 22 facing the side shield 18). The socket 70 of the recline handle 22 receives a post 74 (FIGS. 1-5) of the recline adjustment mechanism. The post 74 projects outboard from the side shield 18. The socket 70 of the recline handle 22 defines a plurality of splines 76 that engage corresponding splines on the post 74 of the recline adjustment mechanism so that the post 74 rotates with the recline handle 22 and vice versa.

The base 64 of the recline handle 22 also defines a hole 78 disposed at the center of the socket 70 and extending through the base 64 and a lateral direction 79 (FIG. 10) of the vehicle. The hole 78 receives a fastener 80 (FIGS. 1-5) that attaches the recline handle 22 to the post 74 of the recline adjustment mechanism. Once the fastener 80 is installed, a disk-shaped cap 82 (FIG. 8) is attached to the base 64 of the recline handle 22 to hide the fastener 80 from view for aesthetic purposes. The base 64 of the recline handle 22 defines a plurality of slots 84 (FIGS. 1-5) that extends radially outward from the hole 78 and the base 64, and the slots 84 receive mounting tabs on the cap 82 to retain the cap 82 on the base 64.

With continued reference to FIGS. 7-9, the lever arm 66 of the recline handle 22 extends between and connects the base 64 of the recline handle 22 and the grip 68 of the up/down handle 20 to one another. The lever arm 66 of the recline handle 22 defines a hole 86 that extends through the lever arm 66 in the lateral direction 79 (FIG. 10) of the vehicle. The grip 68 of the recline handle 22 defines a groove or depression 88 in which the occupant may place his or her fingers to rotate the recline handle 22 upward.

The finger guard 24 includes a base 90, a lever arm 92, and a shroud 94. The finger guard 24 further includes a plurality of mounting tabs 96 that project inboard (e.g., toward the side shield 18) from the base 90. The finger guard 24 is pivotally mounted to the recline handle 22 by inserting the mounting tabs 96 through the hole 86 in the lever arm 66 of the recline handle 22 until the mounting tabs 96 engage the hole 86 via a snap fit. The mounting tabs 96 include flanges 98 that engage the backside 72 of the recline handle 22 when the mounting tabs 96 are fully inserted into the hole 86 to retain the finger guard 24 on the recline handle 22.

The handle assembly 16 further includes a torsion spring 100 that biases the underside surface 40 of the finger guard 24 toward the top surface 42 of the recline handle 22. The torsion spring 100 has a first end 102 and a second end 104 opposite of the first end 102. The torsion spring 100 is captured between the recline handle 22 and the finger guard 24. The recline handle 22 defines a ledge 105 that acts as a stop for the first end 102 of the torsion spring 100, and the finger guard 24 defines a ledge or groove 106 that acts as stop for the second end 102 of the torsion spring 100.

The shroud 94 of the finger guard 24 includes a top wall 108 and a sidewall 110. The top wall 108 of the shroud 94 covers the entire top surface 42 of the recline handle 22 when the shroud 94 of the finger guard 24 rests on the top surface 42 of the recline handle 22. In addition, the top wall 108 of the shroud 94 covers a horizontal gap 112 (FIG. 7) between the side shield 18 and the recline handle 22. The side wall 110 of the shroud covers a vertical gap 114 that exits between the top wall 108 of the finger guard 24 and the recline handle 22 when the up/down handle 20 is rotated upward while the recline handle 22 is not actuated as shown in FIG. 2.

Figure 10:
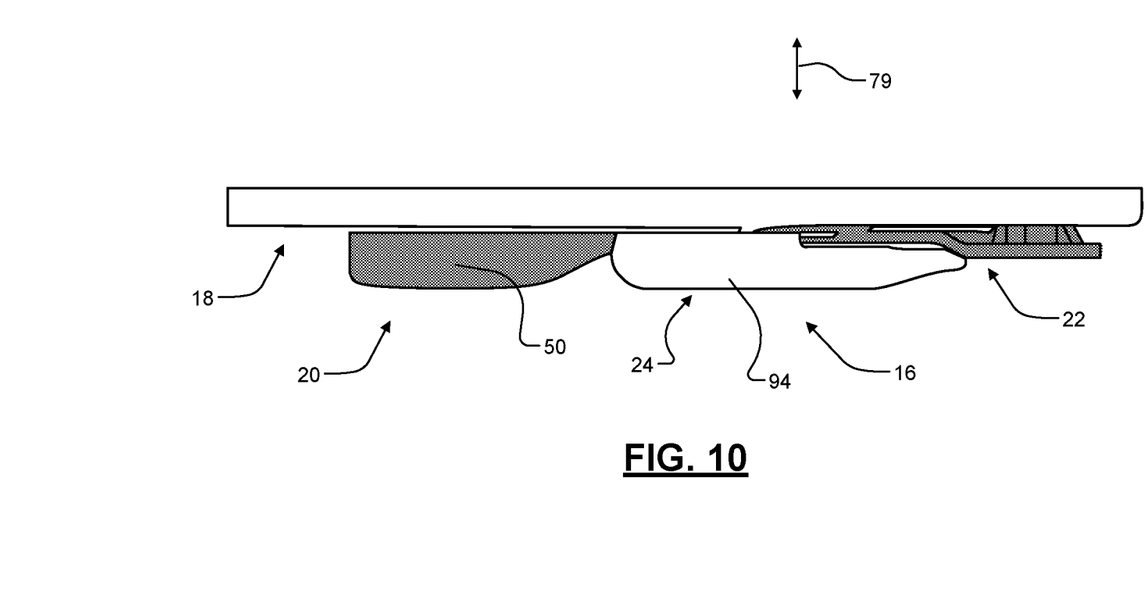
FIG. 10 is a top view of the side shield and the handle assembly of FIG. 1.

Referring now to FIG. 10, the up/down handle 20 and the recline handle 22 are shown in their respective design positions (i.e., their unactuated positions). As shown in FIG. 10, the shroud 94 of the finger guard 24 is aligned with the grip 50 of the up/down handle 20 in the lateral direction 79 of the vehicle. In addition, since the shroud 94 of the finger guard 24 covers the grip 68 of the recline handle 22, the grip 68 is aligned with the grip 50 of the up/down handle 20 in the lateral direction 79 of the vehicle. Furthermore, the shroud 94 of the finger guard 24 in the grip 50 of the up/down handle 20 are disposed about the same distance from the side shield 18.

Figure 11:
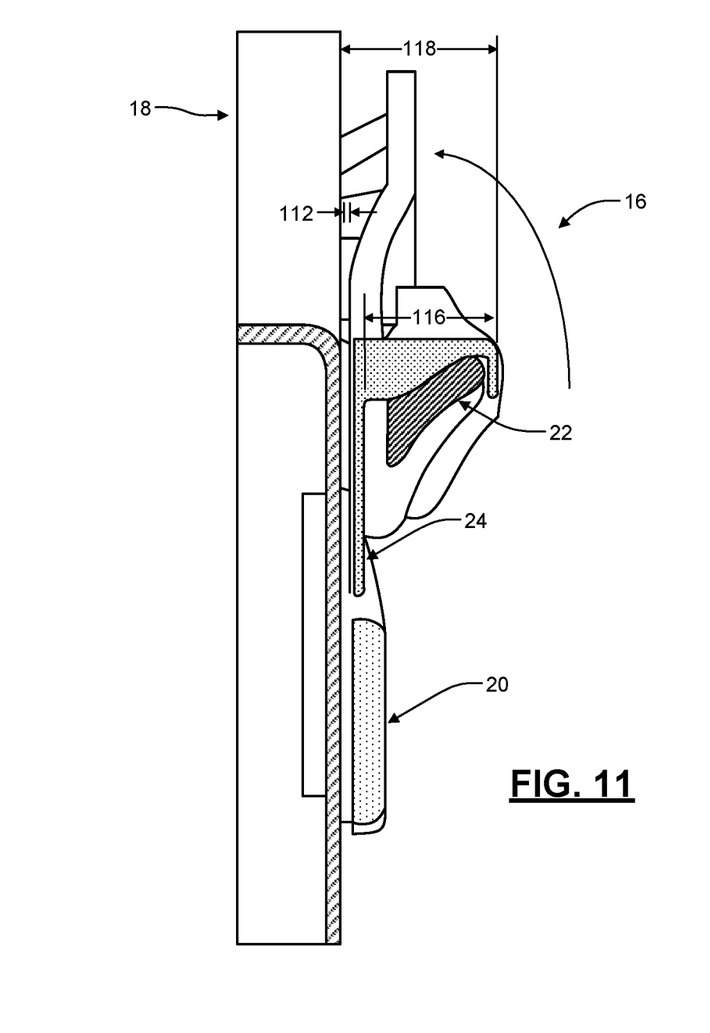
FIG. 11 is a sectioned top view of the side shield and the handle assembly of FIG. 1.

Referring now to FIG. 11, the top wall 108 of the shroud 94 on the finger guard 24 has a width 116. The top wall 108 of the shroud 94 projects from the sidewall 110 of the shroud 94 by a distance equal to the width 116. The width 116 may be greater than or equal to 25 millimeters (mm) to provide a desired amount of finger grip on the recline handle 22. Nonetheless, due to the compact design of the handle assembly 16, the handle assembly 16 may have an overall width 118 that is more than 3 mm less than the overall width of other vehicle seat handle assemblies.

Figure 12:
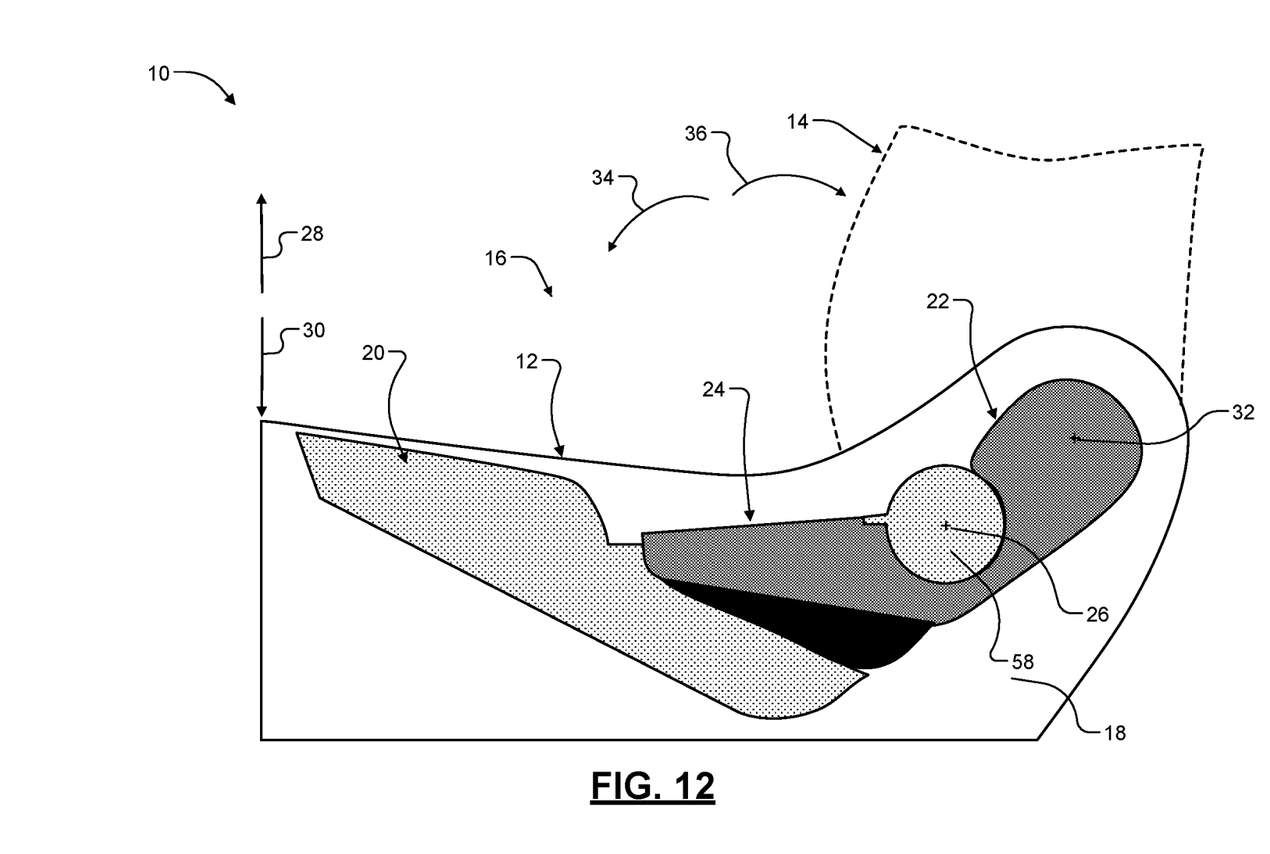
FIG. 12 is a side perspective view of the vehicle seat assembly of FIG. 1 with another example of a handle assembly according to the present disclosure.

Referring now to FIG. 12, a handle assembly 120 is similar or identical to the handle assembly 16 except that the handle assembly 120 does not include the cap 58. Instead, in the handle assembly 120, the sidewall 110 of the shroud 94 on the finger guard 24 covers the fastener that attaches the up/down handle 20 to the vertical adjustment mechanism. Thus, by designing the sidewall 110 of the shroud 94 to cover the fastener that attaches the up/down handle 20 to the vertical adjustment mechanism, the cap 58 may be eliminated.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

When a first element or layer is referred to as being "on," "engaged to," "connected to," or "coupled to" a second element or layer, it may be directly on, engaged, connected or coupled to the other element or layer, or intervening elements or layers may be present between the first and second elements or layers. In contrast, when a first element is referred to as being "directly on," "directly engaged to," "directly connected to," or "directly coupled to" a second element or layer, there may be no intervening elements or layers present between the first and second elements or layers. Other words used to describe the relationship between elements should be interpreted in a like fashion (e.g., "between" versus "directly between," "adjacent" versus "directly adjacent," etc.).

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatial and functional relationships between elements (for example, between modules, circuit elements, semiconductor layers, etc.) are described using various terms, including "connected," "engaged," "coupled," "adjacent," "next to," "on top of," "above," "below," "forward of," "rearward of," and "disposed." Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "and/or" includes any and all combinations of one or more of the associated listed items. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A handle assembly for a seat of a vehicle, the handle assembly comprising:
    an up/down handle configured to adjust a vertical position of a seat bottom when the up/down handle is rotated relative to the seat about a first pivot axis;
    a recline handle configured to allow an angle of a seat back to be adjusted when the recline handle is rotated relative to the seat about a second pivot axis; and
    a finger guard configured to cover a gap between the up/down handle and the recline handle to prevent an occupant in the seat from inserting a finger into the gap, wherein the finger guard is separate from and attached to the recline handle and is configured to rotate about a third pivot axis relative to the recline handle independent of rotation of the recline handle about the second pivot axis.

2. The handle assembly of claim 1 wherein rotating the up/down handle upward about the first pivot axis causes the up/down handle to contact the finger guard and thereby rotate the finger guard upward about the third pivot axis.

3. The handle assembly of claim 1 wherein rotating the recline handle upward about the second pivot axis causes the recline handle to contact the finger guard and thereby rotate the finger guard upward about the third pivot axis.

4. The handle assembly of claim 1 wherein the finger guard is pivotally mounted to the recline handle along the third pivot axis.

5. The handle assembly of claim 1 wherein the recline handle defines a hole that extends through the recline handle in a lateral direction of the vehicle, and the finger guard includes a plurality of mounting tabs that extend through and engage the hole.

6. The handle assembly of claim 5 further comprising a torsion spring that biases an underside surface of the finger guard toward a top surface of the recline handle, wherein the recline handle defines a first stop for a first end of the torsion spring, and the finger guard defines a second stop for a second end of the torsion spring.

7. The handle assembly of claim 1 wherein, if the seat back rotates downward independent of actuation of the recline handle, the recline handle is configured to rotate downward with the seat back.

8. The handle assembly of claim 7 wherein the finger guard is configured to rotate downward with the recline handle until the finger guard contacts the up/down handle, and the recline handle is configured to continue rotating downward with the seat back as the finger guard is at rest due to contact between the finger guard and the up/down handle.

9. The handle assembly of claim 1 wherein the up/down handle defines a hole for receiving a fastener to pivotally mount the up/down handle to the seat bottom, the handle assembly further comprising a cap configured to snap onto the up/down handle and cover the hole.

10. The handle assembly of claim 1 wherein the up/down handle defines a hole for receiving a fastener to pivotally mount the up/down handle to the seat bottom, and the finger guard covers the fastener when the up/down and recline handles are not actuated.

11. A seat assembly for a vehicle, the seat assembly comprising:
    a seat bottom;
    a seat back;
    an up/down handle pivotally mounted to the seat bottom along a first pivot axis, wherein rotating the up/down handle relative to the seat bottom about the first pivot axis adjusts a vertical position of the seat bottom;
    a recline handle pivotally mounted to the seat bottom along a second pivot axis, wherein rotating the recline handle relative to the seat bottom about the second pivot axis enables an angle of the seat back to be adjusted; and
    a finger guard that covers a gap between the up/down handle and the recline handle to prevent an occupant in the seat from inserting a finger into the gap, wherein the finger guard is separate from the recline handle and is pivotally mounted to the recline handle along a third pivot axis to enable rotation of the finger guard relative to the recline handle about the third pivot axis independent of rotation of the recline handle about the second pivot axis.

12. The seat assembly of claim 11 wherein rotating the up/down handle upward about the first pivot axis causes the up/down handle to contact the finger guard and thereby rotate the finger guard upward about the third pivot axis.

13. The seat assembly of claim 11 further comprising a side shield that covers a side of the seat bottom, wherein the up/down and recline handles are disposed outboard of and adjacent to the side shield.

14. The seat assembly of claim 13 wherein each of the up/down and recline handles includes a base, a lever arm, and a grip, and the base of the recline handle is disposed rearward of and higher than the base of the up/down handle.

15. The seat assembly of claim 14 wherein the base of the recline handle defines a socket configured to receive a boss projecting outboard from the side shield to pivotally mount the recline handle to the seat bottom.

16. The seat assembly of claim 15 wherein the socket of the recline handle defines splines configured to engage corresponding splines on a seat recline mechanism.

17. The seat assembly of claim 14 wherein the finger guard includes a base, a lever arm, and a shroud, and the shroud of the finger guard is configured to cover an entire top surface of the grip of the recline handle.

18. The seat assembly of claim 17 wherein the shroud of the finger guard is configured to rest on the top surface of the grip of the recline handle except when the up/down handle is rotated upward while the recline handle is not rotate upward.

19. The seat assembly of claim 17 wherein the shroud of the finger guard is aligned with the grip of the up/down handle in a lateral direction of the vehicle.

20. The seat assembly of claim 17 wherein the shroud of the finger guard includes a top wall configured to cover the entire top surface of the grip of the recline handle and a horizontal gap between the side shield and the recline handle, and a sidewall configured to cover a vertical gap that exits between the top wall of the finger guard and the recline handle when the up/down handle is rotated upward.

* * * * *